United States Patent [19]
Bailey et al.

[11] 3,852,580
[45] Dec. 3, 1974

[54] HYPOTENUSE CORRECTION CIRCUIT

[75] Inventors: Clifford Michael Bailey, Eaton Ford, England; Gerarous Adrianus Mous, Overloon, Netherlands

[73] Assignee: Cincinnati Milacron Inc., Cincinnati, Ohio

[22] Filed: Nov. 1, 1973

[21] Appl. No.: 411,746

[30] Foreign Application Priority Data
Mar. 1, 1973 Great Britain.................... 10036/73

[52] U.S. Cl............................. 235/152, 235/92 MD
[51] Int. Cl........................... G06f 15/46, G06f 1/02
[58] Field of Search ....... 318/573, 603; 235/151.11, 235/152

[56] References Cited
UNITED STATES PATENTS
3,538,315   11/1970   Reuteler ........................ 235/151.11
3,633,013   1/1972   Dummermuth................ 235/151.11

Primary Examiner—Eugene G. Botz

[57] ABSTRACT

A feed rate generator for use in numerical control systems producing drive signals causing a movable member to move in at least two axes of motion at a predetermined velocity along a predetermined path. The feedrate generator producing a feed rate signal having a frequency approximately equal to the frequency of a drive signal along the axis of motion having the largest axial displacement. Further, said feed rate signal cooperates with the numerical control to generate other drive signals such that the vector sum of all the drive signals is approximately equal to the magnitude of the predetermined velocity.

5 Claims, 2 Drawing Figures

HYPOTENUSE CORRECTION CIRCUIT

BACKGROUND OF THE INVENTION

This invention relates generally to the area of numerical controls; and, specifically, the invention discloses a feed rate generator for use with a pulse generator capable of generating a plurality of drive signals whose frequencies not only bear predetermined ratios to each other, but are also such that their vector sum is approximately equal to a predetermined value. Those who are skilled in the art of numerical controls will recognize that such a pulse generator has immediate application wherein each drive signal controls movement of a controlled member; e.g., a worktable, toolhead, etc., along a corresponding axis of motion. The said ratios are established in accordance with the increments of displacement to be effected simultaneously along the different axes of motion. The vector sum of the frequencies of the drive signals determines the resultant velocity of the controlled member, and it is typically required to make this value that which causes the resultant value to be the maximum permitted for the controlled member. Such a pulse generator is disclosed in our co-pending application entitled, "Proportional Pulse Generator," filed on Oct. 29, 1973 and assigned to the present assignee.

Generally, in contouring numerical controls, i.e., in controls in which the controlled member is controlled at a predetermined velocity along a predetermined path, it is necessary that a digital drive signal be produced for each axis of motion. The number of pulses in the drive signal defines the extent of motion in each axis, and the frequency of the drive signal defines the velocity of the member along said axis. To define the frequency of a drive signal for a particular axis of motion, typical numerical controls multiply a feed rate signal representing the resultant velocity along the predetermined path by a ratio of the displacement in said particular axis of motion to the vector magnitude of displacement. The feed rate signal and axial displacement are predetermined quantities, but the vector displacement defined by the vector sum of the axial displacements must be calculated. This calculation, whether achieved directly or by approximation, represents a substantial cost in additional complex control circuits. The present invention discloses a simple and inexpensive apparatus which provides the advantages of a contouring numerical control.

Further, in positioning numerical control systems; i.e., in controls in which the controlled member is moved from one point in space to another point in space without regard to the path therebetween, a feed rate signal is typically derived; e.g., in the two axis case, by dividing the pulse train representing a predetermined velocity by the square root of two. Therefore, each feed increment is executed by moving at 45° to the axes until the shorter of the axial displacements has been traversed. Thereafter the controlled member is moved along only one axis to complete the longer component. It is an advantage of the present invention that the feed rate generator described herein can be inserted in a positioning numerical control. The system will then interpolate more rapidly in executed increments in the direction of the vector defined by the axis displacements rather than in two segments — one at 45° to and the other parallel to an axis.

SUMMARY OF THE INVENTION

According to one embodiment of the invention, a feed rate generator is disclosed for use in a numerical control comprised in part of a pulse generator responsive to a feed rate signal and input signals representing displacements of a movable member along at least two axes of motion. The pulse generator is operative to produce drive signals causing the member to move at a predetermined velocity along a predetermined path defined by said axial displacements. The feed rate generator includes means for producing a pulse train representing the predetermined velocity. Further, means are included which are responsive to the input signals for comparing said signals and producing an output signal representing the largest of said input signals. Further, the generator comprises means responsive to the output signal, the drive signals and the pulse train for generating a feed rate signal. The feed rate signal will have a frequency equal to the frequency of the drive signal representing the largest displacement. Further, said feed rate signal will be generated by reducing the frequency of the pulse train as a function of the other drive signals.

DESCRIPTION OF THE PREFERRED EMBODIMENT

Figure 1:
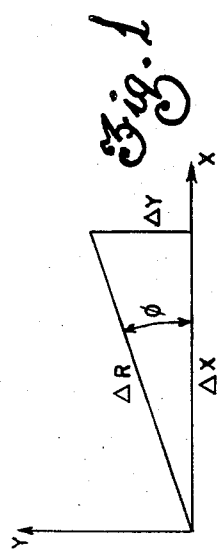
FIG. 1 is an explanatory diagram illustrating typical components of an increment of motion and the resultant vector motion.

Referring to FIG. 1, it can be seen that the X-axis displacement is larger than the Y-axis displacement; and further, the vector displacement R is equal to the vector sum of the axial displacements.

As discussed earlier, the feed rate generator is responsive to a pulse train representing a predetermined velocity $f_m$ for producing a feed rate signal $f_a$ which is approximately equal to the frequency of the drive signal having the greatest velocity. In the example of FIG. 1, the feed rate signal would equal the velocity in the X-axis of motion. The frequency of the Y-axis drive signal would equal the product of the frequency of the feed rate signal times the ratio of the Y-axis displacement to the X-axis displacement. This ratio is generated within the pulse generator as disclosed in the aforementioned co-pending application. Of course, if the Y-axis displacement is greater, the feed rate signal would equal the frequency of the Y-axis drive signal; and the frequency of the X-axis drive signal would equal the product of the frequency of the feed rate signal times the ratio of the X-axis displacement to the Y-axis displacement. The feed rate signal $f_a$ is derived by reducing the frequency of the pulse train $f_m$ representing the predetermined velocity. In the present invention, the predetermined velocity is reduced as a function of the drive signals occurring in the axes of motion having the shorter displacements. In the case of FIG. 1, a predetermined fraction of the pulses representing the Y-axis drive signal $f_y$ would be used to reduce the pulse train $f_m$ to generate the feed rate signal for the X-axis $f_x$. This is shown algebraically below.

1. $f_a = f_x = k_1 f_m$
2. $f_y = f_a\, y/x = f_a \tan\phi$ [see FIG. 1]

3. Let $f_a = f_x = f_m - k_2 f_y$
4. $f_a = f_x = f_m - k_2 f_a \tan\phi$
5. $f_a = f_x = f_m - k_2 k_1 f_m \tan\phi$
6. $f_a = f_x = f_m [1 - k \tan\phi]$ It is necessary to choose a value for $k$ such that the vector sum of $f_x$ and $f_y$, represented by equations (1) and (2), is equal to the predetermined velocity $f_m$.

It can be shown, by computer plotting for example, that in the range of the angle $\phi$ less than or equal to 45°, and if $k=$ two-sevenths, the vector sum closely approximates the predetermined velocity. Reasonable results will obviously be obtained, using other values of $k$ close to two-sevenths, such as one-third or three-tenths.

Figure 2:
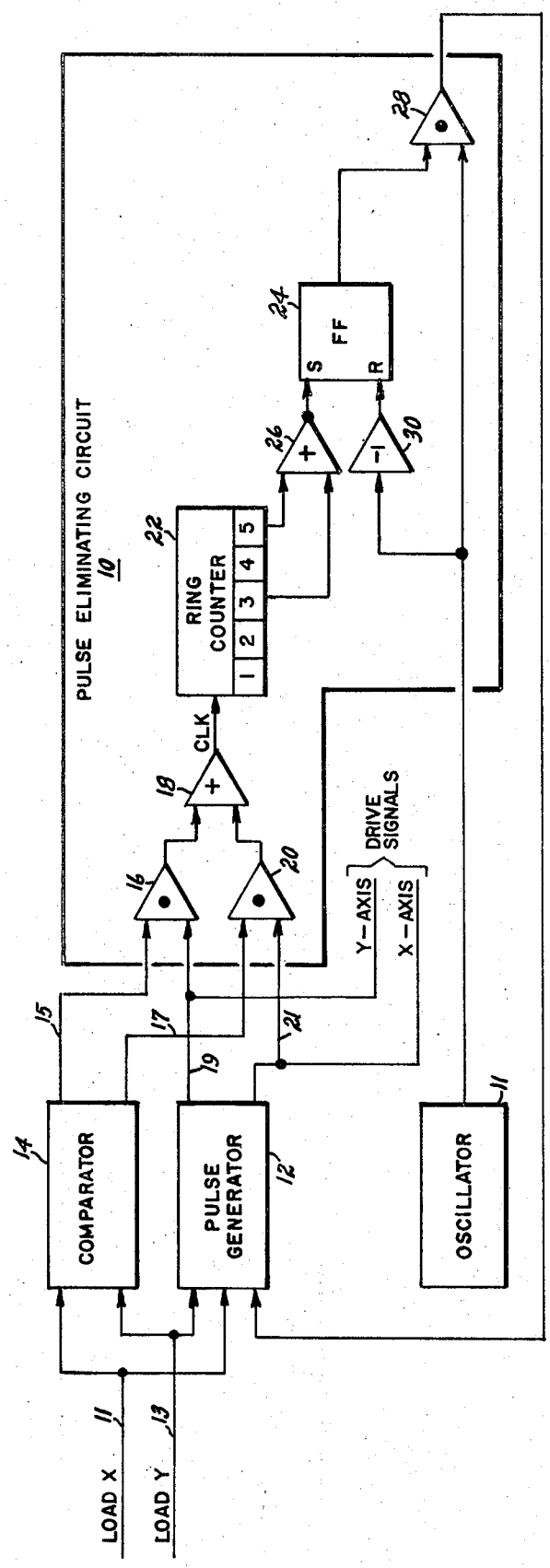
FIG. 2 is a detailed block diagram of one embodiment of the invention.

A circuit operating in accordance with the foregoing analysis with $k$ equal to two-sevenths is shown in FIG. 2. A feed rate signal $fa$ is derived from an input pulse train from an oscillator 11 by means of a pulse eliminating circuit 10. The feed rate signal is applied to a pulse generator 12 which responds to digital values representing the X-axis and Y-axis displacements fed thereto on lines 11 and 13, respectively, to generate drive signals for each axis of motion. If the X-axis displacement is larger than the Y-axis displacement, the feed rate signal will equal the frequency of the drive signal for the X-axis displacement. Further, the frequency of the Y-axis drive signal will be equal to the frequency of the feed rate signal times the ratio of the Y-axis displacement to the X-axis displacement. If the Y-axis displacement is greater than the X-axis displacement, the frequency of the feed rate signal will equal the frequency of the drive signal for the Y-axis; and the frequency of the X-axis drive signal will equal the frequency of the feed rate signal times the ratio of the X-axis displacement to Y-axis displacement. The circuit 12 may take the form described in the aforementioned co-pending application.

In FIG. 2, a comparator 14 compares the axial displacements; and if the X-axis displacement is greater than the Y-axis displacement, an output signal is produced on line 15 which opens an AND gate 16 within the pulse eliminating circuit 10 to pass the Y-axis drive signal on line 19 to an OR gate 18. If the Y-axis displacement is greater than the X-axis displacement an output signal is produced on line 17 which opens an AND gate 20 to pass the X-axis drive signal on line 21 to the OR gate 18. The output of the OR gate 18, therefore, consists of whichever of the drive signals is the slower; and the drive signal thus selected is applied as a clock signal to a five-state ring counter 22. The ring counter 22 has a single bit recirculating therein; and when this bit is in stages 3 or 5, a bistable flip-flop 24 is set via a NOR gate 26. The pulse train $f_m$ is fed to an AND gate 28 which is only enabled when the flip-flop 24 is reset. Therefore, when the flip-flop 24 is set, the next pulse in the pulse train is blocked; but the flip-flop 24 is reset by this pulse via an inverter 30. In this way, one pulse of the pulse train is eliminated for every two pulses in seven of the drive signal passed by the gate 16 or the gate 20.

The frequency of the pulse train applied to the gate 28 can be increased and then decreased to produce controlled acceleration and then deceleration of the controlled member. Further, the frequency of the oscillator 11 may be adjusted by manual controls or programmed information. The execution of the above functions is well-known to those who are skilled in the art. Further, when the number of pulses in the drive signals for each axis of motion equals the magnitudes of the corresponding axial displacements, the drive signals are terminated. The above determination of the extent of axial movement may be accomplished with end point registers or other means well known in the art.

In order to extend the described system to deal with three axes of motion, the proportion $k$ can be made equal to four-elevenths and applied to the aggregate of pulses in the drive signals pertaining to both the medium length displacement and the smallest displacement. The pulses from all three axes can be fed to a combining circuit via different delays or timing signals such that the pulses interleave and do not mask each other. The apparatus necessary to achieve this is well known to those who are skilled in the numerical control art. The comparator now inhibits a gate to block just the drive signal pertaining to the axis of motion having the largest displacement. The combined drive signals from the other axes of motion are fed to a seven stage ring counter of which four stages are connected to the NOR gate 26. The operation to generate a feed rate signal having a frequency equal to the frequency of the drive signal for the largest displacement axis is essentially the same as in the embodiment of FIG. 2. Again, different ratios close to four-elevenths can be chosen for $k$. Further, the frequency of the drive signals for each of the shorter axis displacements will be equal to the frequency of the feed rate signal times the ratio of the respective shorter axis displacement to the largest axis displacement.

While the invention has been illustrated in some detail according to the preferred embodiment shown in the accompanying drawings, and while the preferred illustrated embodiments have been described in some detail, there is no intention to thus limit the invention to such details. On the contrary, it is intended to cover all modifications, alterations and equivalents falling within the spirit and the scope of the appended claims.

What is claimed is:

1. An apparatus of the type for use in a numerical control comprised in part of a pulse generator responsive to a feedrate signal and input signals representing displacements of a movable member along at least two perpendicular axes of motion for producing periodic drive signals causing said member to move at a predetermined velocity along a predetermined path defined by said displacements, wherein the improvement comprises:
    a. means for producing a pulse train representing the predetermined velocity;
    b. means responsive to the input signals for comparing said signals and producing an output signal in response to an input signal representing the largest displacement;
    c. means responsive to the output signal and one of the drive signals corresponding to the axis of motion having the shortest displacement for generating elimination pulses as a function of a predetermined fraction of the number of periods of the one of the drive signals; and
    d. means responsive to the pulse train and the elimination pulses for producing the feedrate signal by inhibiting one pulse in the pulse train in response to each elimination pulse.

2. The apparatus of claim 1 wherein the generating means further comprises:

a. means for gating said output signal with the one of the drive signals to produce clock pulses; and b. means responsive to the clock pulses for counting said clock pulses and producing a first predetermined number of elimination pulses as a function of the second predetermined number of clock pulses.

3. The apparatus of claim 2, wherein the gating means comprises:

a. means for logically combining the output signal with the other of the drive signals representing the smaller axial displacements; and b. means responsive to the combining means for producing discrete clock pulses in response to every pulse in the other of the drive signals.

4. The apparatus of claim 3 wherein the counting means further comprises:

a. a multi-stage counter responsive to the clock pulses for counting said clock pulses, said counter having outputs connected to a number of preselected counter stages whereby the counter produces an elimination pulse each time the counter passes through one of said preselected counter stages; and b. an OR gate connected to each of the counter outputs for producing the elimination pulses therefrom.

5. The apparatus in claim 4 wherein the reducing means further comprises:

a. a first circuit responsive to the elimination pulses and the pulse train for producing a control pulse in response to each elimination pulse; and b. a logic gate responsive to each pulse in the pulse train and each control pulse for producing the feed rate signal by inhibiting a pulse in the pulse train in response to each control pulse.

* * * * *